United States Patent
Komsi

(10) Patent No.: US 7,181,252 B2
(45) Date of Patent: Feb. 20, 2007

(54) SYSTEM AND METHOD FOR PERFORMING SECURITY FUNCTIONS OF A MOBILE STATION

(75) Inventor: Asko Komsi, Cambridge, MA (US)

(73) Assignee: Nokia Corporation, Espoo (FI)

( * ) Notice: Subject to any disclaimer, the term of this patent is extended or adjusted under 35 U.S.C. 154(b) by 524 days.

(21) Appl. No.: 10/315,413

(22) Filed: Dec. 10, 2002

(65) Prior Publication Data

US 2004/0110488 A1  Jun. 10, 2004

(51) Int. Cl.
*H04Q 7/20* (2006.01)
(52) U.S. Cl. ............... 455/567; 455/567; 455/558
(58) Field of Classification Search ............ 455/412.2, 455/414.1, 565, 567, 411, 414.2, 433, 435.1, 455/558; 340/439, 568, 540; 379/112
See application file for complete search history.

(56) References Cited

U.S. PATENT DOCUMENTS

| | | | | |
|---|---|---|---|---|
| 5,467,382 A | * | 11/1995 | Schorman | ............... 455/410 |
| 5,493,611 A | * | 2/1996 | Hubert | ............... 379/387.01 |
| 5,600,708 A | | 2/1997 | Meche et al. | |
| 5,734,978 A | | 3/1998 | Hayatake et al. | |
| 5,794,142 A | | 8/1998 | Vanttila et al. | |
| 5,802,258 A | * | 9/1998 | Chen | ............... 714/10 |
| 5,809,413 A | | 9/1998 | Meche et al. | |
| 5,933,773 A | * | 8/1999 | Barvesten | ............... 455/411 |
| 5,991,396 A | * | 11/1999 | Salm et al. | ............... 379/355.09 |
| 6,032,038 A | | 2/2000 | Schroderus et al. | |
| 6,266,541 B1 | * | 7/2001 | Noda | ............... 455/565 |
| 6,377,791 B1 | | 4/2002 | Pirilä | |
| 6,400,939 B1 | * | 6/2002 | Virtanen et al. | ............... 455/410 |
| 6,694,133 B1 | * | 2/2004 | Tobita et al. | ............... 455/414.1 |
| 2001/0055963 A1 | * | 12/2001 | Cloutier | ............... 455/417 |
| 2002/0046104 A1 | * | 4/2002 | Kaddeche et al. | ............... 705/14 |

(Continued)

FOREIGN PATENT DOCUMENTS

EP      0 750 438 A1   12/1996

(Continued)

OTHER PUBLICATIONS

Joris Evers; *Dutch police fight cell theft with text 'bombs'*; Mar. 2001; 3 pages; available at <http://www.cnn.com/2001/TECH/ptech/03/28/SMS.bomb.idg/>.

(Continued)

*Primary Examiner*—Jean Gelin
(74) *Attorney, Agent, or Firm*—Alston & Bird LLP

(57) ABSTRACT

A system and method are provided for performing security functions of a mobile station adapted to communicate via a communications network. The mobile station comprises a receiver, a controller, and can also include a ringer and/or a user identifying device. The ringer is capable of generating a ringing tone. The user identifying device can generate data identifying a user of the mobile station. The receiver is capable of receiving at least one security message, where the at least one security message comprises at least one security function. For example, the security function can comprise actuating the ringer to continuously generate the ringing tone, and/or actuating the user identifying device to generate user-identifying data, and thereafter transmitting a status message including the user-identifying data. The controller is therefore capable of interpreting the at least one security message, and thereafter performing the at least one security function.

43 Claims, 4 Drawing Sheets

U.S. PATENT DOCUMENTS

| | | | |
|---|---|---|---|
| 2003/0093681 A1* | 5/2003 | Wettstein | 713/185 |
| 2003/0109288 A1* | 6/2003 | Carley et al. | 455/567 |
| 2003/0157926 A1* | 8/2003 | Ala-Laurila et al. | 455/406 |
| 2004/0038664 A1* | 2/2004 | Stoks | 455/404.1 |
| 2004/0203648 A1* | 10/2004 | Wong | 455/414.1 |

FOREIGN PATENT DOCUMENTS

| | | |
|---|---|---|
| EP | 0 796 023 A2 | 9/1997 |
| EP | 0 796 023 A3 | 9/1997 |
| EP | 1 079 654 A1 | 2/2001 |
| EP | 1 170 969 A1 | 1/2002 |
| WO | WO 00/45243 | 8/2000 |

OTHER PUBLICATIONS

*Telstra To Switch Off Mobile Phone Thieves*; Feb. 2002; 4 pages; available at <http://www.cellular.co.za/stats/021602-telstra_to_switch_off_mobile_phone.html>.

* cited by examiner

SYSTEM AND METHOD FOR PERFORMING SECURITY FUNCTIONS OF A MOBILE STATION

FIELD OF THE INVENTION

The present invention relates generally to mobile stations such as mobile telephones and, more particularly, relates to performing security functions of mobile stations to reduce theft and facilitate recovery of stolen, lost or otherwise misplaced mobile stations.

BACKGROUND OF THE INVENTION

In modem mobile telephone systems, each mobile telephone typically includes a replaceable user-identity module, such as subscriber identification module (SIM), which is typically plugged into a mobile telephone when the mobile telephone is taken into use. In this regard, a SIM can typically store any of a number of different data identifying the subscriber, or user, of the mobile telephone, such as a telephone number assigned to the subscriber. In practice, the data can be used to check the user rights of the subscriber each time the user of the mobile telephone uses the services of the system. As the SIM typically includes the data identifying the user, by using the SIM, the subscriber can use any mobile telephone that operates in the system. If no arrangement existed by which misuse could be prevented, then, for example, mobile telephones that have been stolen, lost or otherwise misplaced would be easy to use by anyone possessing a SIM. Therefore, for example, in the GSM system, an international mobile equipment identification (IMEI) code is stored in a permanent memory location in each mobile telephone. The intent is that operators maintain a corresponding equipment identification register, EIR, which contains a list of the equipment identification codes of stolen telephones, for example.

In certain situations, the system checks the equipment identification code of the mobile telephone and compares it with the data in the equipment register. If the equipment is listed as stolen, the system should block its use. In the example GSM system, which is used quite broadly, it has not yet been possible to satisfactorily implement such a checking system. The equipment registers of the operators and the data contained therein are incomplete, and it is not possible in all networks to prevent the use of a stolen mobile telephone, even if it were noticed that it is stolen. Because the inadequacy of the system that prevents misuse is known by many people, mobile telephones are commonly stolen and misused. Further, because the GSM system and the amount of mobile telephones used in the system are continuously growing rapidly, it is probable that these problems will also exist in the future.

SUMMARY OF THE INVENTION

In light of the foregoing background, embodiments of the present invention provide an improved system and method of performing security functions of a mobile station adapted to communicate via a communications network. For example, the system and method of embodiments of the present invention can perform security functions such as generating a continuous ringing tone of the mobile station. Additionally, or alternatively, for example, the system and method of embodiments of the present invention can generate user identifying data, such as voice samples and/or images, and transmit a status message including such user identifying data.

By performing the security functions of the mobile station, embodiments of the present invention can reduce theft and facilitate recovery of stolen, lost or otherwise misplaced mobile stations. The system and method of embodiments of the present invention can initiate performance of the security functions by transmitting one or more security messages to the mobile station. Advantageously, the security messages can be transmitted to the mobile station in any of a number of conventional manners, including via the short messaging service (SMS) using the telephone number, or SMS number, assigned to the user of the mobile station. As such, the system and method of embodiments of the present invention do not require use of the IMEI code of the mobile station to initiate performance of the security functions. Further, the system and method of embodiments of the present invention can perform the security functions based upon messages transmitted to the telephone via an easily maintainable and updateable list of telephone numbers assigned to subscribers of the network (or users of the mobile stations of the network).

It will be appreciated that in some instances the SIM of the mobile station can be replaced with an unauthorized SIM or other user-identity module. In such instances, the telephone number of the mobile station changes to an unauthorized telephone number stored in the unauthorized SIM. Therefore, embodiments of the system and method of the present invention can identify the unauthorized telephone number based upon the IMEI code or other unique identifier of the mobile station. Thereafter, the system and method of embodiments of the present invention can initiate performance of the security functions based upon the unauthorized telephone number of the mobile station. Even in instances in which the system and method of embodiments of the present invention utilize the IMEI code of the mobile station, however, the system and method of such embodiments need not maintain a list of all IMEI codes of all mobile stations in the communications network, but can maintain the IMEI codes of only those mobile stations that include an unauthorized SIM.

According to one aspect of the present invention a communications system is provided that includes a mobile station adapted to communicate via a communications network. The mobile station comprises a receiver, a controller, and can also include a ringer and/or a user identifying device. The ringer is capable of generating a ringing tone. The user identifying device can generate data identifying a user of the mobile station. For example, the user identifying device can comprise a microphone capable of generating a sound recording of the user or an imaging device. Alternatively, the user identifying device can comprise an imaging device capable of generating an image of the user and/or an area surrounding the mobile station.

The receiver is capable of receiving at least one security message, where the at least one security message comprises at least one security function. The security function can comprise any of a number of functions including actuating the ringer to continuously generate the ringing tone, and/or actuating the user identifying device to generate user-identifying data, and thereafter transmitting a status message including the user-identifying data. The controller, which is coupled to the receiver, and the ringer and/or user identifying device, is capable of interpreting the at least one security message. Thereafter, the controller can perform the at least one security function, such as by actuating the ringer and/or the user identifying device.

The system can also include a security service center capable of transmitting at least one security message to the mobile station. In addition, the mobile station can also include a user-specific module that is capable of storing a telephone number and capable of being removed and replaced with an unauthorized user-specific module. In such instances, the security service center can be capable of identifying an unauthorized telephone number of an unauthorized user-specific module when the user-specific module has been replaced with the unauthorized user-specific module. The security service center can then transmit at least one security message to the mobile station based upon the unauthorized telephone number.

More particularly, the mobile station can be capable of transmitting an identifier and the telephone number stored in the user-specific module, such as when the mobile station attempts to communicate via the communications network. The security service center can then identify the unauthorized telephone number of the unauthorized user-specific module based upon the identifier. Before the mobile station transmits the identifier, or as the mobile station transmits the identifier, the security service center can be capable of monitoring the communications network when the user-specific module has been replaced with an unauthorized user-specific module. In this regard, the security service center can receive unauthorized telephone number from the mobile station when the mobile station attempts to communicate with the network, as the security service center cannot otherwise transmit a security message to the mobile station with the telephone number stored in the replaced user-specific module.

A method of performing security functions of a mobile station is also provided. Therefore, embodiments of the present invention provide an improved system and method of performing security functions of a mobile station, such as generating a continuous ringing tone of the mobile station, and/or generating user identifying data and thereafter transmitting a status message including such user identifying data. Advantageously, security messages including the security functions can be transmitted to the mobile station in any of a number of conventional manners, including via SMS using the telephone number, or SMS number, assigned to the user of the mobile station. As such, the system and method of embodiments of the present invention do not require use of the IMEI code of the mobile station to initiate performance of the security functions. And even in embodiments where the system and method identifies an unauthorized telephone number based upon an identifier, such as an IMEI code, the system and method need not maintain a list of all of the IMEI codes of the mobile stations communicating via the communications network. Further, the system and method of embodiments of the present invention can perform the security functions based upon messages transmitted to the telephone via an easily maintainable and updateable list of telephone numbers assigned to subscribers of the network (or users of the mobile stations of the network). As such, the system and method of the present invention solve the problems identified by prior techniques and provide additional advantages.

BRIEF DESCRIPTION OF THE DRAWINGS

Figure 1:
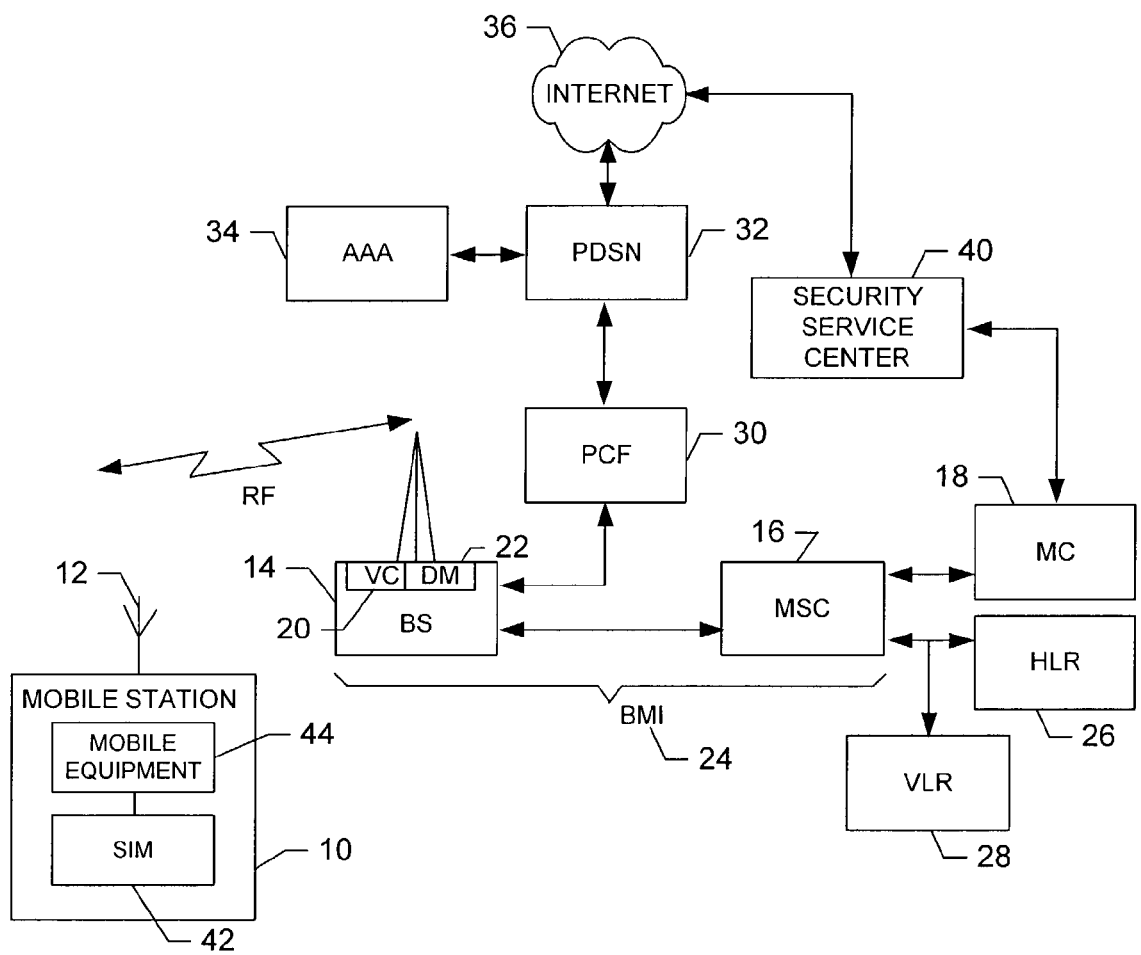
Figure 2:
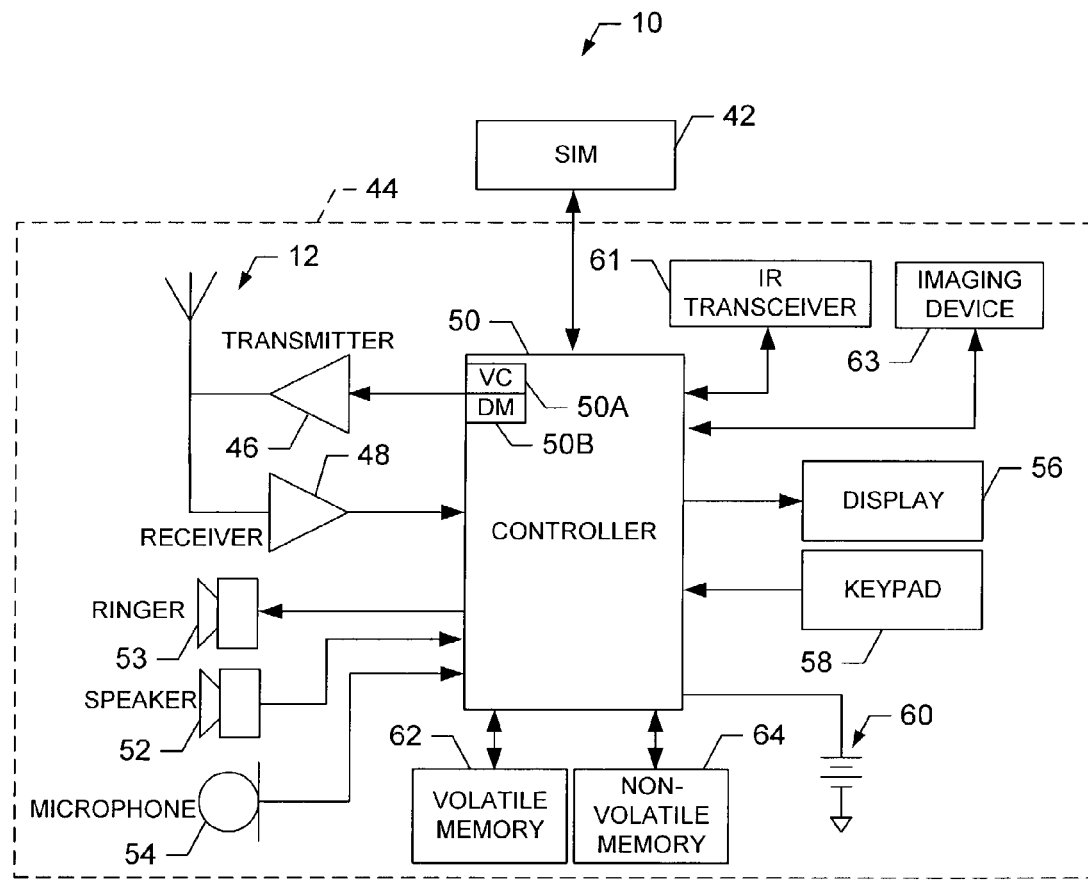
Figure 3A:
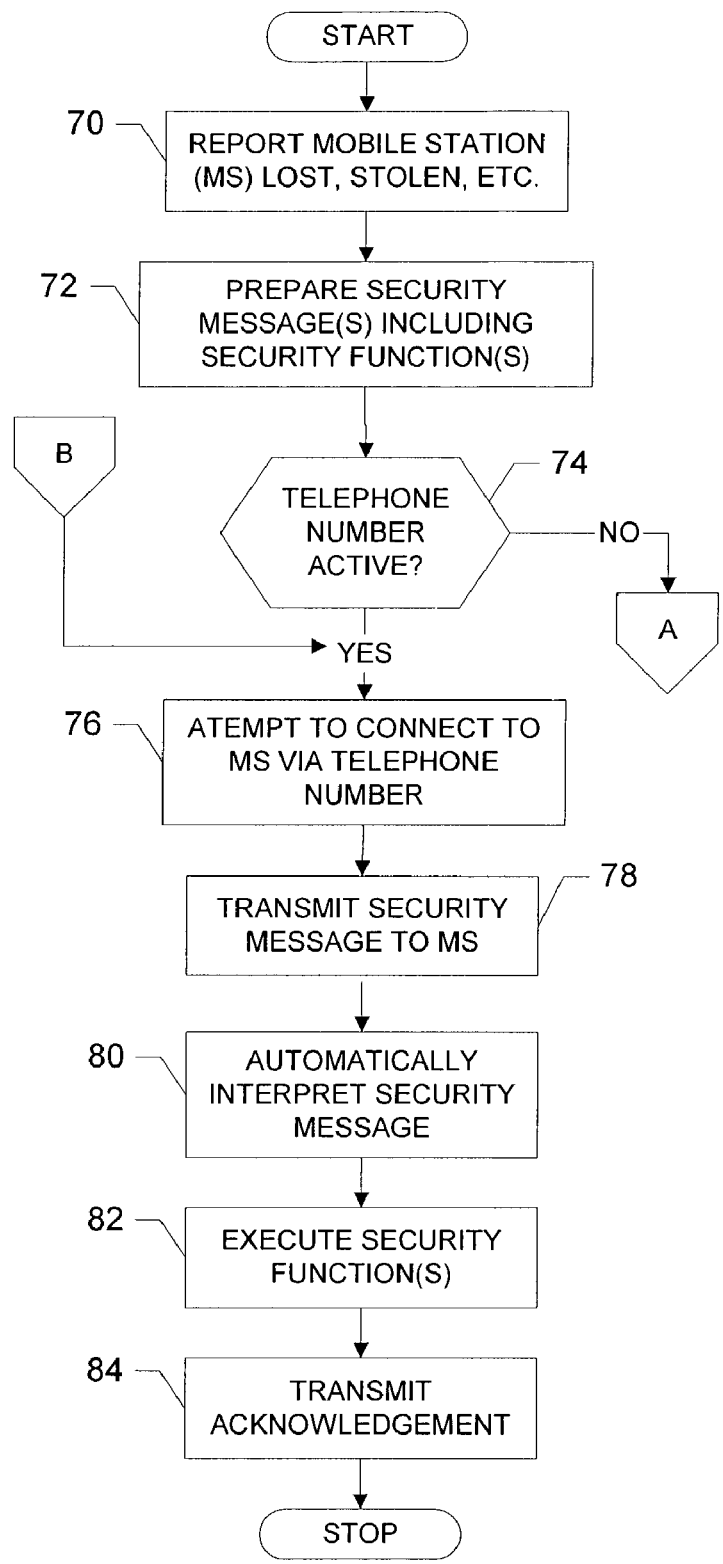
Figure 3B:
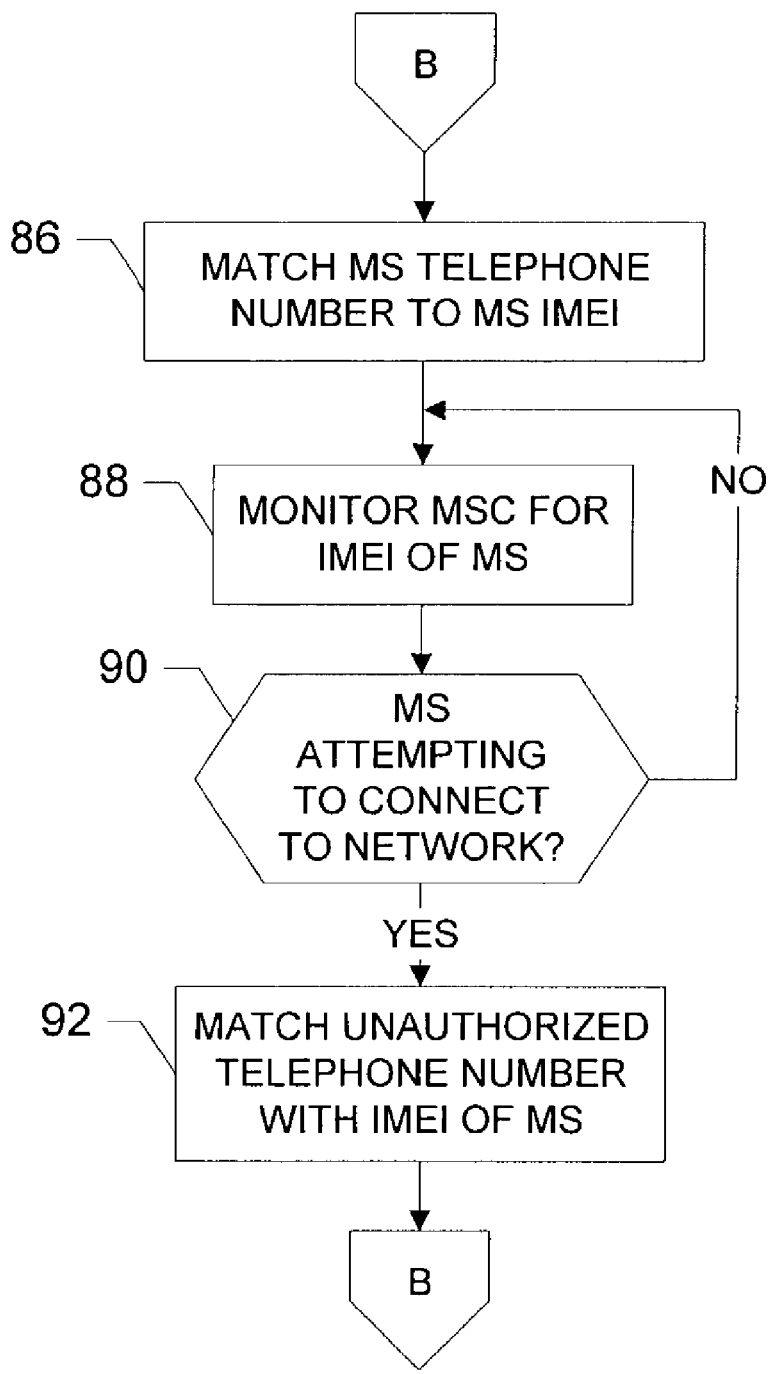

Having thus described the invention in general terms, reference will now be made to the accompanying drawings, which are not necessarily drawn to scale, and wherein:

FIG. 1 is a block diagram of a wireless communications system according to one embodiment of the present invention including a cellular network and a data network to which the mobile station is bidirectionally coupled through wireless RF links;

FIG. 2 is a block diagram of a mobile station according to one embodiment of the present invention; and FIGS. 3A and 3B are flowcharts illustrating various steps in a method for performing security functions of a mobile station according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIGS. 1 and 2, an illustration of one type of wireless communications network including a terminal, such as a mobile station, that would benefit from the present invention is provided. It should be understood, however, that the mobile telephone illustrated and hereinafter described is merely illustrative of one type of mobile station that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, and other types of voice and text communications systems, can readily employ the present invention. Moreover, the system and method of the present invention will be primarily described in conjunction with mobile communications applications. But the system and method of the present invention can be utilized in conjunction with a variety of other applications, both in the mobile communications industries and outside of the mobile communications industries.

As shown, the mobile station 10 includes an antenna 12 for transmitting signals to and for receiving signals from a base site or base station (BS) 14. The base station is a part of a cellular network that includes a mobile switching center (MSC) 16, a message center (MC) 18, voice coder/decoders (vocoders) (VC) 20, data modems (DM) 22, and other units required to operate the network. The MSC is capable of routing calls and messages to and from the mobile station when the mobile station is making and receiving calls. As indicated above, the cellular network may also be referred to as a Base Station/MSC/Interworking function (BMI) 24. The MSC controls the forwarding of messages to and from the mobile station when the station is registered with the network, and also controls the forwarding of messages for the mobile station to and from the MC. Such messages may include, for example, voice messages received by the MSC from users of Public Switched Telephone Network (PSTN) telephones, and may also include Short Message Service (SMS) messages and voice messages received by the MSC from the mobile station or other mobile terminals serviced by the network.

Subscriber data of a mobile station 10 is stored permanently in a Home Location Register (HLR) 26 of the system and temporarily in the Visitor Location Register (VLR) 28 in the area of which the mobile station is located at a given moment. In this regard, the VLR contains selected administrative information necessary for call control and provision of the subscribed services for each mobile station currently located in the geographical area controlled by the VLR. Although each functional entity can be implemented as an independent unit, manufacturers of switching equipment generally implement the VLR together with the MSC 16 so that the geographical area controlled by the MSC corresponds to that controlled by the VLR, thus simplifying the signaling required. As such, the MSC and VLR will collectively be referred to herein as the MSC/VLR.

The mobile station 10 can also be coupled to a data network. For example, the base station BS 14 can be connected to a packet control function (PCF) 30, which is in connection with a Packet Data Serving Node (PDSN) 32. The PDSN is preferably connected to an AAA server 34, which provides Authentication, Authorization, and Accounting services. The AAA server can comprise a Remote Access Dialup User Service (RADIUS) server, as will be appreciated by those skilled in the art. The PDSN can also be connected to a wide area network, such as the Internet 36. In turn, devices such as processing elements (e.g., personal computers, server computers or the like) can be coupled to the mobile station via the PDSN. For example, the processing elements can include one or more processing elements associated with a security service center 40, as illustrated in FIG. 1 and described more fully below. By directly or indirectly connecting both the mobile station and the other devices to the PDSN and the Internet, the mobile station can communicate with the other devices, such as according to the Internet Protocol (IP) specification, to thereby carry out various functions of the mobile station.

According to the present invention, most, if not all, the information elements contained in the mobile station 10 that are related to a mobile subscriber are stored and operated within a user-specific module, such as a subscriber identity module (SIM) 42, a removable user identity module (R-UIM) or the like. Such information elements can include, for example, a telephone number assigned to the mobile station or, more particularly, the owner or other authorized user of the mobile station. The remaining part of the mobile station, called mobile equipment 44, contains the hardware and software specific to the radio interface. The SIM can be a smart card, such as an IC card SIM. An IC card SIM of a standard size may be too large for hand-portable radios and, therefore, a plug-in SIM that is a dedicated module intended to be semi-permanently installed in the mobile equipment can also be used.

According to the present invention, the identification of a mobile subscriber is primarily based on the information stored in the SIM 42. Thus, the mobile subscriber is able to use different mobile equipment 44, as long as the mobile subscriber continues to use the same SIM. Thus, the mobile subscriber can be reached by the same subscriber number (e.g., telephone number). Without the SIM, only emergency calls can be made by the mobile equipment. When used in the mobile equipment, the SIM preferably provides storage of a number of different types of information when the SIM is in network operation. In this regard, the SIM can provide storage of subscriber-related information, such as a telephone number, pager number and/or SMS number assigned to the mobile station 10 or, more particularly, the owner or other authorized user of the mobile station.

Reference is now drawn to FIG. 2, which illustrates a block diagram of a mobile station 10 that would benefit from the present invention. The mobile station includes a transmitter 46, a receiver 48, and a controller 50 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. For example, the mobile station may be capable of operating in accordance with wireless communication protocols IS-136, GSM, and IS-95 (CDMA). Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 50 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 50A, and may include an internal data modem (DM) 50B. Further, as described more fully below, the controller 50 includes the functionality to interpret security messages received by the mobile station, and thereafter perform various security functions in accordance with such security messages.

The mobile station 10 also comprises a user interface including a conventional earphone or speaker 52, a ringer 53, a display 56, and a user input interface, all of which are coupled to the controller 50. The user interface can also include a user identifying device such as, for example, a conventional microphone 54 and/or an imaging device 53 (described below). The imaging device, which can comprise a camera, can be integrated within the mobile station or removably coupled to the mobile station. The user input interface, which allows the mobile station to receive data, can comprise any of a number of devices allowing the mobile station to receive data, such as a keypad 58, a touch display (not shown) or other input device. In embodiments including a keypad, the keypad includes the conventional numeric (0–9) and related keys (#, *), and other keys used for operating the mobile station. The mobile station also includes a battery 60, such as a vibrating battery pack, for powering the various circuits that are required to operate the mobile station, as well as optionally providing mechanical vibration as a detectable output, as described below.

The user identifying device is capable of generating data identifying a user of the mobile station 10. When the user identifying device comprises a microphone 54, for example, the user-identifying data can comprise a sound recording of the user. When the user identifying device comprises an imaging device 53, the user-identifying data can comprise an image of the user of the mobile station, such as an unauthorized user of the mobile station. Additionally, or alternatively, the user-identifying data can include an area surrounding the mobile station, which may or may not include a user of the mobile station, but would be associated with and therefore identify the user.

The mobile station 10 can further include an infrared transceiver 61 or other means of data transfer so that data can be shared with other devices such as other mobile stations, car guidance systems, personal computers, printers and the like. The sharing of data, as well as the remote sharing of data, can also be provided according to a number of different techniques. For example, the mobile station may share data via a Radio Frequency Identification (RFID) transponder tag, as such is known to those skilled in the art. Additionally, or alternatively, the mobile station may share data using Bluetooth brand wireless technology developed by the Bluetooth Special Interest Group.

In addition to the SIM 42, the mobile station 10 can include other memory. In this regard, the mobile station can include volatile memory 62, such as volatile Random Access Memory (RAM) including a cache area for the temporary storage of data. The mobile station can also include other non-volatile memory 64, which can be embedded and/or may be removable. The non-volatile memory can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile station to implement the functions of the mobile station. For example, the memories can include an identifier, such as an international mobile equipment identification (IMEI) code, capable of uniquely identifying the mobile equipment 44, such as to the MSC 16.

Also for example, the memories, and particularly the non-volatile memory 64, can include a directory of names and associated location identifiers, such as mobile telephone numbers, landline telephone numbers, SMS numbers, pager numbers, facsimile numbers, and/or electronic mail (E-mail) addresses that may be entered into memory and thereafter accessed by the user. The memories can also include software routines that control the operation of all or a portion of the controller 50 to thereby implement the present invention. The controller, which can include embedded cache memory, generates appropriate commands and controls the other component blocks of the mobile station.

As indicated in the background section, mobile stations are typically operable even after such stations have been stolen, lost or otherwise misplaced. Thus, to prevent the misuse of such mobile stations, embodiments of the present invention include a security service center 40, as illustrated in FIG. 1. The security service center is capable of transmitting security messages to the mobile station 10 to initiate security functions of the mobile station to thereby reduce theft of, and facilitate recovery of, lost, stolen or otherwise misplaced mobile stations. In this regard, the security service center can be coupled to the mobile station, such as via the MC 18 and BMI 24. Additionally, or alternatively, the security service center can be coupled to the mobile station, such as via the PDSN 32, the PCF 30 and the BMI. Although the security service center is shown and described herein as comprising a separate network element, it will be appreciated that the security service center can be embodied in any of a number of the other elements of the network including, for example, the MC. Alternatively, the network need not include a security service center. In such instances, the functions of the security service center can be performed by any of a number of the other elements, including the MC.

The security service center 40 is capable of transmitting security messages to the mobile station 10. The security messages can comprise any of a number of different types of messages capable of being interpreted by the mobile station, including email messages, enhanced messaging service (EMS) messages, and/or multimedia messaging service (MMS) messages. In one exemplar embodiment described herein, however, the security messages comprise short messaging service (SMS) messages. Thus, according to this embodiment, the security service center typically transmits the security messages to the mobile station via the MC 18.

As indicated above, the controller 50 includes the functionality to interpret the security messages received by the mobile station 10, and thereafter perform various security functions in accordance with such security messages. In this regard, the controller can be instructed by security messages to perform respective security functions. For example, the controller can be instructed to disable user operating functionality of the mobile station. In such instances, the controller can prevent a user of the mobile station, such as an unauthorized user, from placing or receiving telephone calls, messages or the like, as well as prevent the user from viewing a directory stored within the mobile station. It will be appreciated that even in instances in which the user operating functionality of the mobile station has been disabled, other functionality, such as the controller receiving other security messages and/or allowing the user to place emergency telephone calls, may still be operable.

In addition to, or in lieu of, instructing the controller 50 to disable user operating functionality, the controller can be instructed by one or more security messages to only permit the mobile station 10 to place a telephone call to a designated telephone number, such as the landline or other telephone number of an authorized recipient (e.g., the owner of the phone). The controller can also be instructed to present a warning, such as on the display 56. For example, the controller can be instructed to present a warning indicating that the mobile station has been reported stolen. The mobile station can present the warning in any of a number of different manners, such as presenting the warning continuously on the display, presenting the warning for a given time period, and/or presenting the warning periodically a given number of times. As such, by presenting the warning, the mobile station can deter the use of a stolen mobile station, or facilitate return of a lost or otherwise misplaced mobile station. The controller can also be instructed to actuate the ringer 53 to continuously ring while power is applied to the mobile station 10. Thus, power to the mobile station must be turned off to turn the ringer off, effectively making the mobile station inoperable. Further, the controller can be instructed to clear, purge or otherwise erase all personal information from memory (e.g., SIM 42, volatile memory 62, and/or non-volatile memory 64). For example, the controller can be instructed to erase a directory of names and associated location identifiers that may be entered into memory. In one embodiment, the controller can be instructed to transmit such personal information to the security service center 40 before the personal information is erased.

Further, the controller 50 can be instructed by one or more security messages to generate and thereafter transmit one or more status messages, such as to the security service center 40. For example, the controller can be instructed to generate and thereafter transmit a status message including a location of the mobile station 10, as such may be determined according to any of a number of conventional techniques, including via a global positioning system (GPS). Also, for example, the controller can be instructed to generate and transmit a usage history of the mobile station, such as a history of all incoming and outgoing telephone calls to the mobile station. Further, for example, the controller can be instructed to transmit a status message including one or more images, as such may be generated by the imaging device 63. Still further, for example, the controller can be instructed to record and thereafter transmit one or more voice recordings, as such may be received by the microphone 54 from an unauthorized user of the mobile station. As will be appreciated, the status messages transmitted by the mobile station can comprise any of a number of different types of messages, including email, EMS, MMS and SMS messages.

By transmitting status messages including, for example, the location of the mobile station, usage history of the mobile station, images and/or voice recordings, the controller can facilitate location and recovery of a lost, stolen or otherwise misplaced mobile station. For example, by transmitting a status message including the location of the mobile station, the controller can facilitate locating the mobile station. Also, for example, by transmitting a status message including one or more images, such as of an unauthorized user of the mobile station, the controller can facilitate identifying and thereafter locating the unauthorized user, to thereby locate and recover the mobile station.

It will also be appreciated that the controller 50 can be instructed to perform one or more security functions simultaneously. In this regard, the security service center 40 can transmit subsequent security messages to the mobile station 10 while the mobile station is performing one or more previously instructed security functions. In addition, or in the alternative, the security service center can transmit security messages that include more than one security function. For example, the controller can be instructed to simultaneously disable user operability of the mobile station, while simultaneously displaying a warning, actuating the ringer 53 to continuously ring, and/or generating and transmitting one or more security messages.

Reference is now drawn to FIGS. 3A and 3B, which illustrate a method of performing security functions of a mobile station 10 according to one embodiment of the present invention. According to the illustrated embodiment, the method is initiated when the mobile station is reported lost, stolen or otherwise misplaced, as shown in block 70. The mobile station can be reported in any of a number of different manners. For example, an owner or other authorized user of the mobile station can report the mobile station as being stolen, lost or otherwise misplaced by calling an operator at the security service center 40, or otherwise under the control of the security service center. Alternatively, the authorized user can report the mobile station being misplaced by sending the security service center a message, such as via the Internet 36 according to conventional techniques of sending email or other messages from a personal computer or the like.

After the mobile station 10 has been reported misplaced, the security service center prepares one or more security messages that include one or more security functions, as shown in block 72. The security functions included within the security message can be selected in any of a number of different manners, such as based upon preferences of the authorized user of the mobile station. The security messages can be prepared in any of a number of different manners. For example, the security messages can be prepared as conventional SMS messages, and include a header or other identifier such that the controller 50 can interpret the SMS messages as security messages. Additionally, or alternatively, the security messages can be prepared to include a key or other identifier such that the controller can identify the security messages as coming from an authorized security service center 40. Further, the security messages can be prepared by encoding the security functions (and possibly the key) such that the controller can more readily interpret the security messages and, more particularly, the security functions.

To illustrate how a security message may be prepared, consider a security message that includes a key comprising ABCDEFG, the security function instructing the controller 50 to disable the mobile station 10, a parameter indicating that the security function last forever, and a security function directing the controller to display a warning message stating "This phone is stolen!" In such an instance, the security message may comprise the following string: "//SECMSG0ABCDEFG0, 10,2FFFFF,3This phone is stolen!0". In the foregoing string, "//SECMSG0ABCDEFG0" represents a header identifying the message as a security message and including the key, where the key is separated from the header and the rest of the security message by "0"s. The security function disable is included after a comma and is represented by "10," where the security disable function is placed in order in the security message by a "1" and the function is represented by "0." Similarly, the parameter that the security function last forever is represented by "2FFFFF," where the function is placed in order by a "2" and is represented by the hexadecimal value "FFFFF." Further, the warning message, which is placed in order by "3," is included in the security message as written, i.e., "This phone is stolen!. The security message can then be closed with another separator, i.e., "0."

As illustrated in block 74, then, the security service center 40 attempts to establish a connection with the mobile station 10, such as using a telephone number, SMS number or the like (all of which will be individually and/or collectively be referred to herein as the telephone number), assigned to the authorized user of the mobile station. As indicated above, the SIM 42 of the mobile station can provide storage of subscriber-related information, such as a telephone number assigned to the authorized user of the mobile station. As such, it will be appreciated that if an unauthorized user of the mobile station has removed and replaced the SIM, the security service center will not be capable of establishing a connection with the mobile station using the telephone number assigned to the authorized user. Thus, the security service center can determine whether the telephone number is active based upon whether the security service center can establish a connection with the mobile station. In such instances, it can be assumed that if the mobile station is not powered on, the telephone number is not active, albeit in a more temporary manner than if the SIM has been removed and replaced.

If the telephone number is not active, such as when the SIM 42 has been removed and replaced, the security service center 40 can match in identifier of the mobile station 10, such as the IMEI, to the telephone number assigned to the authorized user, as shown in block 86 of FIG. 3B. Then, the security service center can monitor the network, such as by monitoring the MSC 16, for the mobile station, as illustrated in block 88. In this regard, when ever the mobile station attempts to communicate with the MSC, the mobile station identifies itself to the MSC by transmitting the IMEI or other identifier of the mobile station, as well as the telephone number of the mobile station (i.e., telephone number stored in the SIM). As such, when the mobile station attempts to connect to the network, the security service center can identify the mobile station based on the IMEI, and thereafter receive the new, unauthorized telephone number as that transmitted to the MSC with the IMEI, as shown in blocks 90 and 92. Thereafter, the security service center can proceed in a manner similar to when the SIM has not been removed and replaced, as described below.

As indicated above, in instances in which the mobile station 10 is not powered on, the telephone number can be considered not active. In such instances, it will be appreciated that the telephone number will become active upon applying power to the mobile station (i.e., powering on the mobile station). In this regard, the security service center 40 can queue the security messages for delivery to the mobile station, as well as monitor the MSC 18, when the security service center detects that the telephone number of the mobile station is not active. As such, when power is applied to the mobile station and the telephone number becomes active, the security messages can be delivered to the telephone number, as described below.

If the telephone number is active, or if the security service center 40 has otherwise acquired an active (i.e., unauthorized) telephone number of the mobile station 10, the security service center can establish a connection with the mobile station, as shown in block 76 of FIG. 3A. Thereafter, as shown in block 78, the security service center can transmit the security message to the mobile station, such as according to conventional SMS transmission techniques. Upon receipt of the security message, the controller 50 can automatically recognize the message as a security message, such as based upon a header of the security message. The controller can then automatically interpret the security message, as shown in block 80. Thereafter, as shown in block 82, the controller can perform the one or more security functions within the security message, such as by disabling user operability of the mobile station, presenting a warning, actuating the ringer 53, and/or transmitting one or more status messages. After performing the security functions, and/or after successfully interpreting the security message, the controller can transmit an acknowledgement back to the security service center, as illustrated in block 84.

The controller 50 can be adapted to continue performing the security functions based upon parameters in the security message, such as performing the security functions forever or for a limited time period. Additionally, or alternatively, the controller can be adapted to perform the security functions until the mobile station 10 is reset or performance of the security functions is disabled, such as by an authorized entity (e.g., security service center 40). The controller can be reset, and the security functions disabled, in a number of different manners, such as by transmitting another security message to the mobile station instructing the controller to stop performing the security functions. Further, as will be appreciated by those skilled in the art, the controller will typically cease performing the security functions when power to the mobile station is disabled, such as when the battery runs down or the mobile station is otherwise powered off. In such instances, the controller can be adapted such that the controller will continue to perform the security functions, in a manner similar to before, when power is restored to the mobile station.

Embodiments of the present invention therefore provide an improved system and method of performing security functions of a mobile station, such as generating a continuous ringing tone of the mobile station, and/or generating user identifying data and thereafter transmitting a status message including such user identifying data. Advantageously, security messages including the security functions can be transmitted to the mobile station in any of a number of conventional manners, including via SMS using the telephone number, or SMS number, assigned to the user of the mobile station. As such, the system and method of embodiments of the present invention do not require use of the IMEI code of the mobile station to initiate performance of the security functions. Further, the system and method of embodiments of the present invention can perform the security functions based upon messages transmitted to the telephone via an easily maintainable and updateable list of telephone numbers assigned to subscribers of the network (or users of the mobile stations of the network). As indicated above, in some embodiments an unauthorized telephone number is identified based upon an identifier, such as an IMEI code. Even in these embodiments, however, the system and method need not maintain a list of all of the IMEI codes of all of the mobile stations communicating via the communications network.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A communications system comprising:
   a mobile station configured to communicate via a communications network, wherein the mobile station comprises:
   a ringer capable of generating a ringing tone;
   a receiver configured to receiving at least one security message, wherein the at least one security message comprises at least one security function, and wherein at least one security function comprises actuating the ringer to continuously generate the ringing tone; and
   a controller coupled to the ringer and the receiver, wherein the controller is configured to interpreting the at least one security message and thereafter performing the at least one security function,
   wherein the mobile station further comprises a user identifying device configured to generating data identifying a user of the mobile station.

2. A system according to claim 1, wherein at least one security function comprises actuating the user identifying device to generate user-identifying data, and thereafter transmitting a status message including the user-identifying data.

3. A system according to claim 2, wherein the user identifying device comprises a microphone and the data identifying the user comprises a sound recording of the user.

4. A system according to claim 2, wherein the user identifying device comprises an imaging device and the data identifying the user comprises an image of at least one of the user and an area surrounding the mobile station.

5. A system according to claim 1 further comprising a security service center capable of transmitting at least one security message to the mobile station.

6. A system according to claim 5, wherein the mobile station further comprises a user-specific module that is capable of storing a telephone number and capable of being removed and replaced with an unauthorized user-specific module, wherein the security service center is capable of identifying an unauthorized telephone number of an unauthorized user-specific module when the user-specific module has been replaced with the unauthorized user-specific module, and wherein the security service center is capable of transmitting at least one security message to the mobile station based upon the unauthorized telephone number.

7. A system according to claim 6, wherein the mobile station is capable of transmitting an identifier and the telephone number stored in the user-specific module, and wherein the security service center is capable of identifying an unauthorized telephone number of the unauthorized user-specific module based upon the identifier.

8. A system according to claim 7, wherein the security service center is capable of monitoring the communications network when the user-specific module has been replaced with an unauthorized user-specific module.

9. A system according to claim 7, wherein the mobile station is capable of transmitting an identifier and the telephone number stored in the user-specific module when the mobile station attempts to communicate via the communications network.

10. A communications system comprising:
a mobile station configured to communicate via a communications network, wherein the mobile station comprises:
a user identifying device configured to generating data identifying a user of the mobile station;
a receiver configured to receiving at least one security message, wherein the least one security message comprises at least one security function, and wherein at least one security function comprises actuating the user identifying device to generate user-identifying data, and thereafter transmitting a status message including the user-identifying data; and
a controller configured to the user identifying device and the receiver, wherein the controller is configured to interpreting the at least one security message and thereafter performing the at least one security function.

11. A system according to claim 10, wherein the user identifying device comprises a microphone and the data identifying the user comprises a sound recording of the user.

12. A system according to claim 10, wherein the user identifying device comprises an imaging device and the data identifying the user comprises an image of at least one of the user and an area surrounding the mobile station.

13. A system according to claim 10, wherein the mobile station further comprises a ringer capable of generating a ringing tone, and wherein the receiver is capable of receiving at least one security message that comprises a security function including actuating the ringer to continuously generate the ringing tone.

14. A system according to claim 10 further comprising a security service center capable of transmitting at least one security message to the mobile station.

15. A system according to claim 14, wherein the mobile station further comprises a user-specific module that is capable of storing a telephone number and capable of being removed and replaced with an unauthorized user-specific module, wherein the security service center is capable of identifying an unauthorized telephone number of an unauthorized user-specific module when the user-specific module has been replaced with the unauthorized user-specific module, and wherein the security service center is capable of transmitting at least one security message to the mobile station based upon the unauthorized telephone number.

16. A system according to claim 15, wherein the mobile station is capable of transmitting an identifier and the telephone number stored in the user-specific module, and wherein the security service center is capable of identifying an unauthorized telephone number of the unauthorized user-specific module based upon the identifier.

17. A system according to claim 16, wherein the security service center is capable of monitoring the communications network when the user-specific module has been replaced with an unauthorized user-specific module.

18. A system according to claim 16, wherein the mobile station is capable of transmitting an identifier and the telephone number stored in the user-specific module when the mobile station attempts to communicate via the communications network.

19. A communications system comprising:
mobile station configured to communicate via a communications network, the mobile station comprising:
a user-specific module capable of storing a telephone number, wherein the user-specific module is capable of being removed and replaced with an unauthorized user-specific module;
a controller capable of receiving at least one security message including at least one security function, and thereafter performing the at least one security function; and
a security service center capable of identifying an unauthorized telephone number of an unauthorized user-specific module when the user-specific module has been replaced with the unauthorized user-specific module, and wherein the security service center is capable of transmitting at least one security message to the mobile station based upon the unauthorized telephone number,
wherein the mobile station further comprises a user identifying device capable of generating data identifying a user of the mobile station.

20. A system according to claim 19, wherein the mobile station is capable of transmitting an identifier and the telephone number stored in the user-specific module, and wherein the security service center is capable of identifying an unauthorized telephone number of the unauthorized user-specific module based upon the identifier.

21. A system according to claim 20, wherein the security service center is capable of monitoring the communications network when the user-specific module has been replaced with an unauthorized user-specific module.

22. A system according to claim 20, wherein the mobile station is capable of transmitting an identifier and the telephone number stored in the user-specific module when the mobile station attempts to communicate via the communications network.

23. A system according to claim 19, wherein the mobile station further comprises a ringer capable of generating a ringing tone, wherein the controller is capable of receiving at least one security message comprising at least one security function including actuating the ringer to continuously generate the ringing tone.

24. A system according to claim 19, wherein the controller is capable of receiving at least one security message comprising at least one security function including actuating the user identifying device to generate user-identifying data, and thereafter transmitting a status message including the user-identifying data.

25. A system according to claim 24, wherein the user identifying device comprises a microphone and the data identifying the user comprises a sound recording of the user.

26. A system according to claim 24, wherein the user identifying device comprises an imaging device and the data identifying the user comprises an image of at least one of the user and an area surrounding the mobile station.

27. A method of performing security functions of a mobile station configured to communicate via a communications network, wherein the method comprises:
  receiving at least one security message at the mobile station, wherein the at least one security message comprises at least one security function, and wherein at least one security function comprises continuously generating a ringing tone;
  interpreting the at least one security message based upon the at least one security function; and
  performing the at least one security function, wherein performing the at least one security function includes continuously generating the ringing tone,
  wherein the at least one security function comprises generating data identifying a user of the mobile station.

28. A method according to claim 27, further comprising thereafter transmitting a status message including the user-identifying data, and wherein performing the at least one security function includes generating the user-identifying data and thereafter transmitting the status message.

29. A method according to claim 27 further comprising transmitting at least one security message to the mobile station before receiving the at least one security message at the mobile station.

30. A method according to claim 29, wherein the mobile station includes a user-specific module that is capable of storing a telephone number and capable of being removed and replaced with an unauthorized user-specific module, the method further comprising:
  identifying an unauthorized telephone number of an unauthorized user-specific module when the user-specific module has been replaced with the unauthorized user-specific module, wherein transmitting at least one security message comprises transmitting at least one security message to the mobile station based upon the unauthorized telephone number.

31. A method according to claim 30 further comprising attempting to communicate via the communications network, wherein attempting to communicate includes transmitting an identifier and a telephone number that is stored in the user-specific module before identifying the unauthorized telephone number, and wherein identifying an unauthorized telephone number comprises identifying an unauthorized telephone number of an unauthorized user-specific module based upon the identifier.

32. A method according to claim 31 further comprising monitoring the communications network before attempting to communicate via the communications network.

33. A method of performing security functions of a mobile station configured to communicate via a communications network, wherein the method comprises:
  receiving at least one security message at the mobile station, wherein the at least one security message comprises at least one security function, and wherein at least one security function comprises generating data identifying a user of the mobile station and thereafter transmitting a status message including the user-identifying data;
  interpreting the at least one security message based upon the at least one security function; and
  performing the at least one security function, wherein performing the at least one security function includes generating the user-identifying data and thereafter transmitting the status message including the user-identifying data.

34. A method according to claim 33, wherein at least one security message comprises a security function including continuously generating a ringing tone, and wherein performing the at least one security function includes continuously generating the ringing tone.

35. A method according to claim 33 further comprising transmitting at least one security message to the mobile station before receiving the at least one security message at the mobile station.

36. A method according to claim 33, wherein the mobile station includes a user-specific module that is capable of storing a telephone number and capable of being removed and replaced with an unauthorized user-specific module, the method further comprising:
  identifying an unauthorized telephone number of an unauthorized user-specific module when the user-specific module has been replaced with the unauthorized user-specific module, wherein transmitting at least one security message comprises transmitting at least one security message to the mobile station based upon the unauthorized telephone number.

37. A method according to claim 36 further comprising attempting to communicate via the communications network, wherein attempting to communicate includes transmitting an identifier and a telephone number that is stored in the user-specific module before identifying the unauthorized telephone number, and wherein identifying an unauthorized telephone number comprises identifying an unauthorized telephone number of an unauthorized user-specific module based upon the identifier,
  wherein at least one security function comprises generating data identifying a user of the mobile station.

38. A method according to claim 37 further comprising monitoring the communications network before attempting to communicate via the communications network.

39. A method of performing security functions of a mobile station configured to communicate via a communications network, wherein the mobile station includes a user-specific module that is capable of storing a telephone number and configured to being removed and replaced with an unauthorized user-specific module, and wherein the method comprises:
  identifying an unauthorized telephone number of an unauthorized user-specific module when the user-specific module has been replaced with the unauthorized user-specific module;
  transmitting at least one security message to the mobile station based upon the unauthorized telephone number, wherein the at least one security message includes at least one security function;
  receiving at least one security message, and thereafter interpreting the at least one security message based upon the at least one security function; and
  performing the at least one security function.

40. A method according to claim 39 further comprising attempting to communicate via the communications network, wherein attempting to communicate includes transmitting an identifier and a telephone number that is stored in the user-specific module before identifying the unauthorized telephone number, and wherein identifying an unauthorized telephone number comprises identifying an unauthorized telephone number of an unauthorized user-specific module based upon the identifier.

41. A method according to claim 40 further comprising monitoring the communications network before attempting to communicate via the communications network.

42. A method according to claim 39, wherein at least one security function comprises continuously generating a ringing tone, and wherein performing the at least one security function includes continuously generating the ringing tone.

43. A method according to claim 39, further comprising thereafter transmitting a status message including the user-identifying data, and wherein performing the at least one security function includes generating the user-identifying data and thereafter transmitting the status message.

* * * * *

UNITED STATES PATENT AND TRADEMARK OFFICE
CERTIFICATE OF CORRECTION

| | |
|---|---|
| PATENT NO. | : 7,181,252 B2 |
| APPLICATION NO. | : 10/315413 |
| DATED | : February 20, 2007 |
| INVENTOR(S) | : Komsi |

It is certified that error appears in the above-identified patent and that said Letters Patent is hereby corrected as shown below:

<u>Column 1,</u>
Line 14, "modem" should read --modern--.

<u>Column 13,</u>
Line 25, "the" should read --at--.

Signed and Sealed this

Fifteenth Day of May, 2007

JON W. DUDAS
*Director of the United States Patent and Trademark Office*